US011356191B2

United States Patent
Koch et al.

(10) Patent No.: US 11,356,191 B2
(45) Date of Patent: *Jun. 7, 2022

(54) RECONFIGURABLE OPTICAL ROUTER

(71) Applicant: Juniper Networks, Inc., Sunnyvale, CA (US)

(72) Inventors: Brian Robert Koch, Brisbane, CA (US); Daniel Sparacin, Sunnyvale, CA (US); Alexander W. Fang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,146

(22) Filed: Oct. 7, 2020

(65) Prior Publication Data

US 2021/0021367 A1 Jan. 21, 2021

Related U.S. Application Data

(63) Continuation of application No. 16/402,970, filed on May 3, 2019, now Pat. No. 10,826,643, which is a
(Continued)

(51) Int. Cl.
*H04B 10/00* (2013.01)
*H04J 14/02* (2006.01)
(Continued)

(52) U.S. Cl.
CPC ........ *H04J 14/0267* (2013.01); *H04B 10/503* (2013.01); *H04B 10/506* (2013.01);
(Continued)

(58) Field of Classification Search
CPC combination set(s) only.
See application file for complete search history.

(56) References Cited

U.S. PATENT DOCUMENTS

| 5,002,350 A | 3/1991 | Dragone |
| 5,455,699 A | 10/1995 | Glance et al. |

(Continued)

FOREIGN PATENT DOCUMENTS

EP 2690803 B1 5/2018

OTHER PUBLICATIONS

"U.S. Appl. No. 13/559,400 Pre-Appeal Brief Request filed Mar. 2, 2016", 5 pgs.
(Continued)

*Primary Examiner* — Agustin Bello
(74) *Attorney, Agent, or Firm* — Schwegman Lundberg & Woessner, P.A.

(57) ABSTRACT

Embodiments of the invention describe apparatuses, optical systems, and methods for utilizing a dynamically reconfigurable optical transmitter. A laser array outputs a plurality of laser signals (which may further be modulated based on electrical signals), each of the plurality of laser signals having a wavelength, wherein the wavelength of each of the plurality of laser signals is tunable based on other electrical signals. An optical router receives the plurality of (modulated) laser signals at input ports and outputs the plurality of received (modulated) laser signals to one or more output ports based on the tuned wavelength of each of the plurality of received laser signals. This reconfigurable transmitter enables dynamic bandwidth allocation for multiple destinations via the tuning of the laser wavelengths.

20 Claims, 10 Drawing Sheets

Related U.S. Application Data continuation of application No. 15/375,532, filed on Dec. 12, 2016, now Pat. No. 10,320,515, which is a continuation of application No. 13/559,400, filed on Jul. 26, 2012, now Pat. No. 9,525,490.

(51) Int. Cl.
*H04J 14/00* (2006.01)
*H04B 10/50* (2013.01)
*H04B 10/564* (2013.01)
*H04Q 11/00* (2006.01)

(52) U.S. Cl.
CPC ............ *H04B 10/564* (2013.01); *H04J 14/00* (2013.01); *H04J 14/0212* (2013.01); *H04J 14/0257* (2013.01); *H04Q 11/0005* (2013.01); *H04Q 2011/0022* (2013.01); *H04Q 2011/0032* (2013.01); *H04Q 2011/0039* (2013.01)

(56) References Cited

U.S. PATENT DOCUMENTS

| | | | |
|---|---|---|---|
| 5,515,460 A | 5/1996 | Stone | |
| 5,612,968 A | 3/1997 | Zah | |
| 5,617,234 A * | 4/1997 | Koga | G02B 6/12011 385/37 |
| 5,745,612 A | 4/1998 | Wang et al. | |
| 5,870,216 A | 2/1999 | Brock et al. | |
| 5,892,604 A | 4/1999 | Yamanaka et al. | |
| 5,973,809 A | 10/1999 | Okayama | |
| 6,049,640 A | 4/2000 | Doerr | |
| 6,058,233 A | 5/2000 | Dragone | |
| 6,067,389 A | 5/2000 | Fatechi et al. | |
| 6,118,562 A * | 9/2000 | Lee | H04B 10/506 398/1 |
| 6,195,187 B1 * | 2/2001 | Soref | G02B 6/12007 398/9 |
| 6,304,350 B1 | 10/2001 | Doerr et al. | |
| 6,400,864 B1 * | 6/2002 | Lee | G02B 6/12011 359/341.1 |
| 6,594,049 B1 | 7/2003 | Brinkman et al. | |
| 6,597,841 B1 | 7/2003 | Dingel | |
| 6,636,668 B1 * | 10/2003 | Al-hemyari | G02B 6/12007 385/16 |
| 6,643,421 B1 * | 11/2003 | Chin | G02B 6/12007 385/15 |
| 6,678,432 B2 * | 1/2004 | Shigeta | H01S 5/02216 372/26 |
| 6,731,425 B1 | 5/2004 | Mazzini et al. | |
| 6,907,198 B2 * | 6/2005 | Nishimura | G02B 6/12007 385/14 |
| 7,110,669 B2 | 9/2006 | Ofek et al. | |
| 7,130,499 B2 * | 10/2006 | Grubb | G02B 6/12004 385/14 |
| 7,135,382 B2 * | 11/2006 | Joyner | G02B 6/12011 438/455 |
| 7,158,699 B2 | 1/2007 | Welch et al. | |
| 7,171,117 B1 | 1/2007 | Gripp et al. | |
| 7,194,165 B2 | 3/2007 | Hosoi | |
| 7,245,829 B1 * | 7/2007 | Sindile | H04J 14/0227 398/45 |
| 7,426,210 B1 * | 9/2008 | Miles | H04J 14/0223 370/400 |
| 7,489,838 B2 * | 2/2009 | Kish, Jr. | H04B 10/506 385/14 |
| 7,519,246 B2 * | 4/2009 | Welch | G02B 6/12004 372/26 |
| 7,546,001 B2 * | 6/2009 | Welch | H01S 5/04254 385/14 |
| 7,548,668 B2 | 6/2009 | Chen et al. | |
| 7,680,368 B2 | 3/2010 | Welch et al. | |
| 7,747,114 B2 * | 6/2010 | Peters | G02B 6/12019 385/37 |
| 7,751,658 B2 | 7/2010 | Welch et al. | |
| 7,773,837 B2 | 8/2010 | Welch et al. | |
| 7,801,446 B2 * | 9/2010 | Little | G02B 6/29395 398/85 |
| 7,885,492 B2 * | 2/2011 | Welch | G02B 6/12011 385/14 |
| 8,073,342 B2 * | 12/2011 | Caplan | H04B 10/564 398/201 |
| 8,285,151 B2 | 10/2012 | Shen et al. | |
| 8,472,805 B2 | 6/2013 | Lam et al. | |
| 8,594,471 B2 * | 11/2013 | Julien | G02B 6/12019 385/24 |
| 8,705,972 B2 * | 4/2014 | McLaren | G02B 6/12007 398/79 |
| 9,285,538 B2 | 3/2016 | Shen et al. | |
| 9,525,490 B2 | 12/2016 | Koch et al. | |
| 10,320,515 B1 | 6/2019 | Koch et al. | |
| 10,826,643 B2 | 11/2020 | Koch et al. | |
| 2002/0021467 A1 | 2/2002 | Ofek et al. | |
| 2003/0030866 A1 | 2/2003 | Yoo | |
| 2006/0008272 A1 * | 1/2006 | Abeles | H04B 10/2575 398/48 |
| 2006/0008273 A1 | 1/2006 | Xue et al. | |
| 2007/0077068 A1 * | 4/2007 | Mazed | H04J 14/0252 398/71 |
| 2007/0116468 A1 | 5/2007 | Ji et al. | |
| 2008/0080866 A1 * | 4/2008 | Bai | H04J 14/02 398/87 |
| 2008/0138088 A1 * | 6/2008 | Welch | H04B 10/506 398/183 |
| 2009/0129723 A1 * | 5/2009 | Chen | G02F 1/3133 385/14 |
| 2009/0220228 A1 * | 9/2009 | Popovic | G02B 6/29383 398/48 |
| 2009/0226168 A1 * | 9/2009 | Boduch | H04J 14/0204 398/48 |
| 2009/0226172 A1 * | 9/2009 | Larikova | H04J 14/0212 398/83 |
| 2009/0269069 A1 | 10/2009 | Mahgerefteh et al. | |
| 2010/0028007 A1 * | 2/2010 | Miura | H04J 14/0212 398/81 |
| 2010/0054733 A1 * | 3/2010 | Hosking | H04B 10/40 398/25 |
| 2010/0054741 A1 * | 3/2010 | Urino | H04J 14/0246 398/79 |
| 2010/0166424 A1 | 7/2010 | Nagarajan et al. | |
| 2011/0064419 A1 | 3/2011 | Chen et al. | |
| 2011/0164620 A1 * | 7/2011 | Jinno | H04J 14/0204 370/392 |
| 2011/0293279 A1 * | 12/2011 | Lam | H04J 14/02 398/79 |
| 2012/0128373 A1 | 5/2012 | Smith et al. | |
| 2012/0182552 A1 * | 7/2012 | Heidrich | G01N 21/7746 356/364 |
| 2012/0207477 A1 * | 8/2012 | Takeguchi | H04J 14/0221 398/79 |
| 2012/0224851 A1 * | 9/2012 | Takara | H04J 14/0221 398/45 |
| 2012/0251101 A1 * | 10/2012 | McNicol | H04B 10/506 398/25 |
| 2013/0004163 A1 * | 1/2013 | Aoki | H04B 10/572 398/34 |
| 2013/0016971 A1 * | 1/2013 | Zheng | H04B 10/506 398/58 |
| 2013/0170833 A1 * | 7/2013 | Nagarajan | G02F 1/2257 398/48 |
| 2013/0188951 A1 | 7/2013 | Zheng et al. | |
| 2013/0195446 A1 | 8/2013 | Zheng et al. | |
| 2013/0223844 A1 * | 8/2013 | Hwang | H04B 10/506 398/91 |
| 2014/0086585 A1 | 3/2014 | Li et al. | |
| 2014/0270776 A1 * | 9/2014 | Jinno | H04J 14/0204 398/69 |
| 2014/0328591 A1 * | 11/2014 | Koch | H04J 14/0257 398/49 |

(56) References Cited

U.S. PATENT DOCUMENTS

| | | | | |
|---|---|---|---|---|
| 2015/0124187 | A1* | 5/2015 | Xie | G02F 1/313 349/41 |
| 2016/0226617 | A1* | 8/2016 | Muth | H04J 14/0256 |
| 2019/0260492 | A1* | 8/2019 | Koch | H04J 14/0257 |

OTHER PUBLICATIONS

"U.S. Appl. No. 13/559,400, Advisory Action dated Apr. 9, 2015", 4 pgs.

"U.S. Appl. No. 13/559,400, Appeal Brief filed May 2, 2016", 16 pgs.

"U.S. Appl. No. 13/559,400, Final Office Action dated Jun. 11, 2015", 17 pgs.

"U.S. Appl. No. 13/559,400, Final Office Action dated Dec. 23, 2015", 14 pgs.

"U.S. Appl. No. 13/559,400, Final Office Action dated Dec. 24, 2014", 16 pgs.

"U.S. Appl. No. 13/559,400, Non Final Office Action dated Jun. 13, 2014", 14 pgs.

"U.S. Appl. No. 13/559,400, Notice of Allowance dated Oct. 24, 2016", 5 pgs.

"U.S. Appl. No. 13/559,400, Response filed Mar. 26, 2015 to Final Office Action dated Dec. 24, 2014", 11 pgs.

"U.S. Appl. No. 13/559,400, Response filed Jun. 13, 2014 to Non Final Office Action dated Jun. 13, 2014", 14 pgs.

"U.S. Appl. No. 13/559,400, Response filed Nov. 13, 2015 to Final Office Action dated Jun. 11, 2015", 13 pgs.

"U.S. Appl. No. 15/375,532, Examiner Interview Summary dated Jan. 14, 2019", 6 pgs.

"U.S. Appl. No. 15/375,532, Final Office Action dated Apr. 5, 2018", 16 pgs.

"U.S. Appl. No. 15/375,532, Final Office Action dated Oct. 5, 2018", 14 pgs.

"U.S. Appl. No. 15/375,532, Non Final Office Action dated Nov. 1, 2017", 22 pgs.

"U.S. Appl. No. 15/375,532, Notice of Allowance dated Feb. 14, 2019", 6 pgs.

"U.S. Appl. No. 15/375,532, Preliminary Amendment filed Jan. 6, 2017", 11 pgs.

"U.S. Appl. No. 15/375,532, Respone filed Jan. 22, 2019 to Final Office Action dated Oct. 5, 2018", 11 pgs.

"U.S. Appl. No. 15/375,532, Response filed Jan. 31, 2018 to Non Final Office Action dated Nov. 1, 2017", 18 pgs.

"U.S. Appl. No. 15/375,532, Response filed Aug. 3, 2018 to Final Office Action dated Apr. 5, 2018", 11 pgs.

"U.S. Appl. No. 16/402,970, Final Office Action dated Oct. 3, 2019", 13 pgs.

"U.S. Appl. No. 16/402,970, Non Final Office Action dated Jan. 10, 2020", 16 pgs.

"U.S. Appl. No. 16/402,970, Notice of Allowance dated Jun. 25, 2020", 5 pgs.

"U.S. Appl. No. 16/402,970, Response filed Jan. 3, 2020 to Final Office Action dated Oct. 3, 2019", 12 pgs.

"U.S. Appl. No. 16/402,970, Response filed Jun. 10, 2020 to Non Final Office Action dated Jan. 10, 2020", 13 pgs.

"European Application Serial No. 13003749.2, Extended European Search Report dated Oct. 25, 2013", 6 pgs.

"European Application Serial No. 13003749.2, Response filed Jul. 25, 2014 to Extended European Search Report dated Oct. 25, 2013", 20 pgs.

"European Application Serial No. 18169429.0, Extended European Search Report dated Oct. 29, 2018", 7 pgs.

"European Application Serial No. 18169429.0, Response filed May 28, 2019 to Extended European Search Report dated Oct. 29, 2018", 15 pgs.

"European Application Serial No. 21180668.2, Extended European Search Report dated Oct. 11, 2021", 10 pgs.

\* cited by examiner

RECONFIGURABLE OPTICAL ROUTER

This application is a continuation of U.S. patent application Ser. No. 16/402,970, filed May 3, 2019, which is a continuation of U.S. patent application Ser. No. 15/375,532, filed Dec. 12, 2016, which is a continuation of U.S. patent application Ser. No. 13/559,400, filed Jul. 26, 2012, all of which are incorporated by reference herein in their entirety.

TECHNICAL FIELD

This disclosure relates generally to the field of photonics, and in particular but not exclusively, to optical transmitters.

BACKGROUND

Existing optical transmitters have static output configurations. Therefore, existing optical transmitters must be designed specifically for their intended application or network location, and cannot be used for different applications. Additionally, if specific signals are to be routed and/or combined to different locations in a network, existing solutions require a separate switching element on the transmitter chip or at some external location in the network. Requiring a separate switching element can result in increased power consumption and circuit size for the extra components, and higher loss in the system.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures are not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system, and method to dynamically configure an optical transmitter are described herein. According to one embodiment, a reconfigurable optical transmitter allows for dynamic routing of laser signals (i.e., optical fields) to different destinations in a network by tuning the transmitter laser wavelengths. In one such embodiment, control electronics at the transmitter may perform the routing rather than at an intermediate location in a network. An optical transmitter having a laser array and an optical router may be dynamically reconfigured by tuning the wavelengths of the laser signals output by the laser array, and by determining which output port(s) of the optical router to output the laser signals to based on the tuned wavelengths of the laser signals. Dynamic reconfigurability can enable use of the same transmitter for multiple applications and network configurations, and/or allow for reallocation of bandwidth in optical networks. In one embodiment, a reconfigurable optical transmitter reduces costs associated with transmitter design and manufacturing, and allows optical system designers to change network configurations without replacing or physically reconfiguring hardware.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
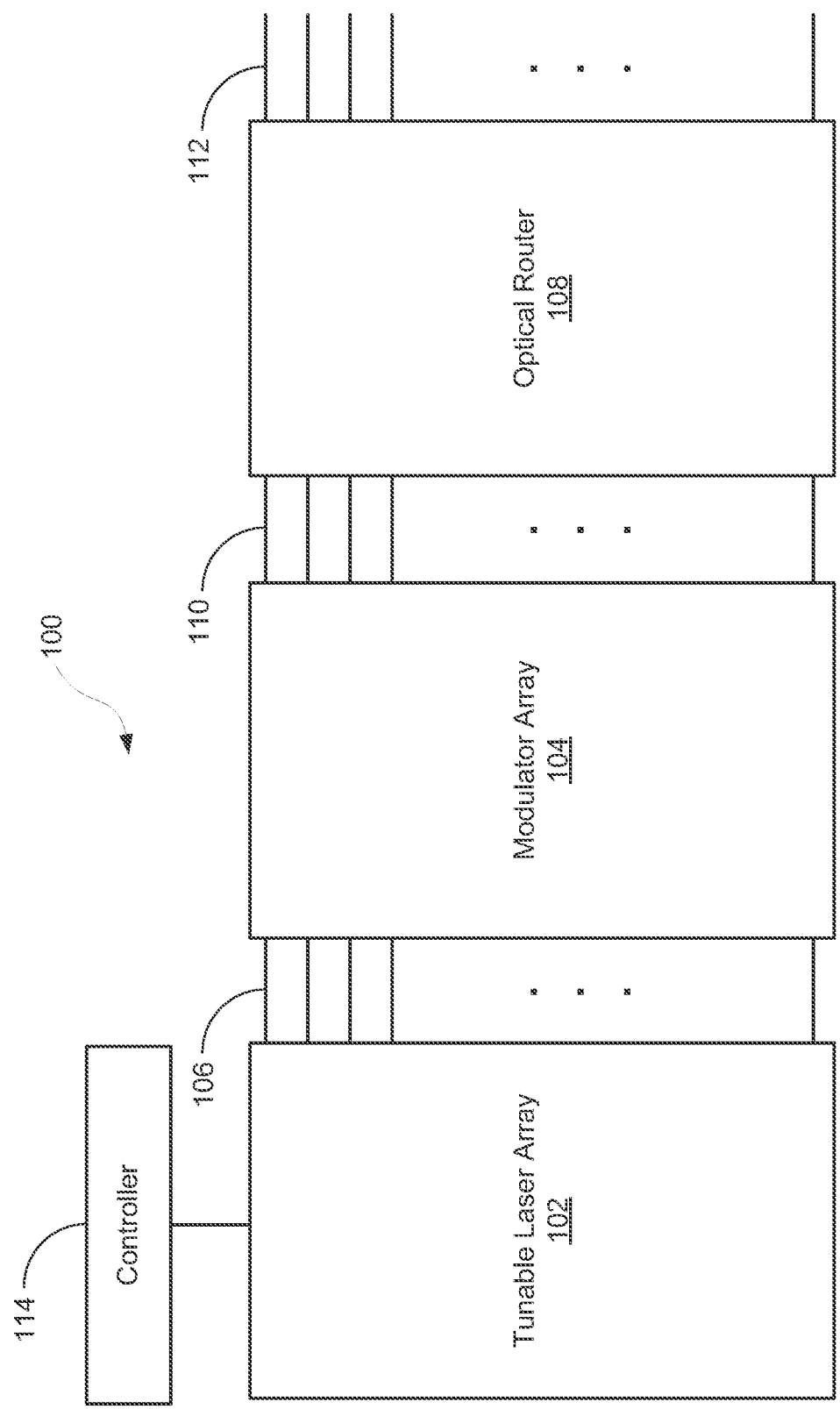
FIG. 1 is a block diagram of a reconfigurable optical transmitter according to an embodiment of the invention.

FIG. 1 is a block diagram of a reconfigurable optical transmitter according to an embodiment of the invention. Optical transmitter 100 includes tunable laser array 102 and optical router 108. Tunable laser array 102 outputs a plurality of laser signals (i.e., optical fields). Each of the plurality of laser signals has a wavelength, wherein the wavelength of each of the plurality of laser signals is tunable based on electrical signals to generate an output configuration for output ports of an optical router. In other words, a bandwidth density of at least one of the output ports is configurable to output at least two of the plurality laser signals based on one or more of the above described electrical signals for tuning the wavelength of one or more of the plurality of laser signals.

The electrical signals for tuning the wavelengths of the optical fields of the laser array can be generated in any manner. For example, optical field controller 114, which can include software, hardware, or any combination thereof, can generate one or more electrical signals for tuning the wavelengths of the optical fields output by tunable laser array 102. An optical system including a transmitter can include such an optical field controller to generate electrical signals for tuning the wavelengths of the optical fields.

Tuning the wavelengths of the optical fields of laser array 102 can be achieved in any number of ways. For example, tunable laser array 102 can include a tunable ring filter which includes a tuning region. A bias voltage applied to the tuning region of the tunable ring filter determines the specific wavelength of a signal received by a gain region of the laser array. Other embodiments can include other means for tuning laser array 102 including any active filter, passive filter, or combination thereof. For example, a passive Mach Zehnder filter can be used for tuning laser array 102.

In one embodiment, optical transmitter 100 includes a modulator array 104. Modulator array 104 modulates laser signals 106 received from tunable laser array 102 based on electrical signals. For example, modulator array 104 can modulate laser signals 106 with data received in the form of electrical signals. Modulator 104 outputs modulated laser signals to the optical router 108. In another embodiment, tunable laser array 102 includes modulators. Yet another embodiment does not include a modulator to modulate the laser signals.

Optical router 108 is an optical dispersive element that routes light on a given input port to one or more different output ports depending on the wavelength(s) of the incoming light. Optical router 108 receives the plurality of laser signals at input ports and outputs the plurality of received laser signals to one or more output ports in the generated output configuration based on the tuned wavelength of each of the plurality of received laser signals. In one embodiment, optical router 108 outputs the signals to one or more of the output ports in the generated output configuration based further on which of the input ports receives each of the plurality of laser signals.

An output configuration based on which input port receives a laser signal and/or the incoming wavelength can be achieved via a wavelength grid. For example, optical router 108 can be designed such that for a given input port and wavelength, that signal will be routed to output port N. In one embodiment (e.g., some AWG and Echelle grating based routers), if sending a laser signal with wavelength λ results in an optical router outputting that signal at output port N, sending a laser signal with a wavelength incremented by one wavelength on the wavelength grid (i.e., λ+1), results the optical router outputting that signal at output port N+1. After the last port, the optical router can loop routing back to the first port. Similarly, in one embodiment, if sending a laser signal with wavelength λ to input port M results in an optical router outputting that signal at output port N, then sending a laser signal with wavelength λ to input port M+1 can result in the optical router outputting that signal at output port N+1. In another embodiment (e.g., a ring-based router), the output configuration of an optical router based on the incoming wavelength and on which port receives a laser signal can be non-cyclic and/or arbitrary. Although the above description of a wavelength grid refers to a single frequency being output at a single output port, a wavelength grid can include more complex arrangements consistent with embodiments described herein.

Different embodiments of optical transmitter 100 can include tunable laser array 102, modulator array 104, and optical router 108 on the same or different chips. For example, tunable laser array 102, modulator array 104, and optical router 108 can be located on the same chip. In another example, optical router 108 is located on a separate chip from tunable laser array 102. In one such embodiment, the tunable laser array (potentially integrated with modulator (s)) has parallel outputs connected to separate fibers. The optical router can be located outside the optical transmitter chip at some position between the transmitter chip and receiver. In one embodiment, having the optical router located on a separate chip allows the optical router to be modified separately from the transmitter (or even excluded from the network entirely) to allow for optimized performance and/or specific network configurations.

In another example, modulator array 104 is located on a separate chip from tunable laser array 102. In yet another embodiment, modulator array 104 and optical router 108 are both located on chips separate from tunable laser array 102.

In one embodiment, some of the waveguides of optical transmitter 100 comprise different materials. For example, waveguides of modulator 104 and waveguides of the input ports and the output ports of the optical router can comprise overlapping regions of a silicon semiconductor material and a III-V semiconductor material.

Optical transmitter 100 can include coupling elements 106, 110, and 112 between the tunable laser array 102, modulator 104, and/or optical router 108. Coupling elements 106, 110, and 112 can include waveguides and/or optical fibers.

Figure 2:
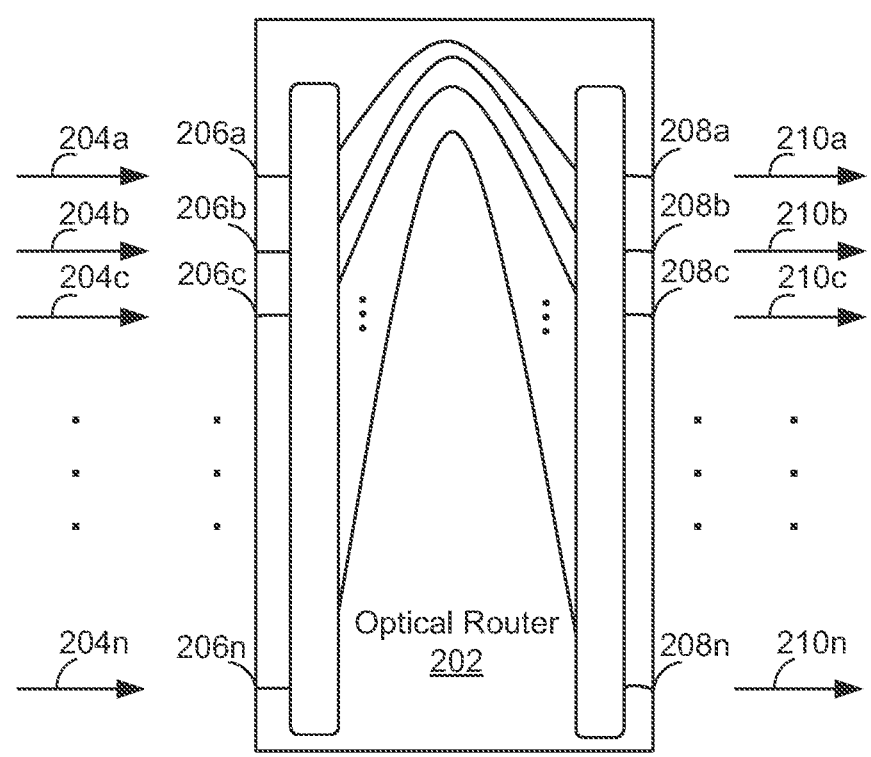
FIG. 2 is a block diagram of a reconfigurable optical router according to an embodiment of the invention.

FIG. 2 is a block diagram of a reconfigurable optical router according to an embodiment of the invention. Optical router 202 includes input ports 206a-206n and output ports 208a-208n. Optical router 202 receives a plurality of laser signals 204a-204n at input ports 206a-206n and outputs the plurality of received laser signals as signals 210a-210n to one or more of output ports 208a-208n based on a tuned wavelength of each of the plurality of received laser signals 204a-204n. The plurality of laser signals 204a-204n is output by a laser array and can be modulated based on electrical signals. In one embodiment, each of the plurality of laser signals has a wavelength which is tunable based on other electrical signals. In one example, the electrical signals for tuning the wavelengths are generated by an optical field controller for generating an output configuration for the output ports of the optical router. Tuning the wavelength of each of the laser signals can change the output configuration of optical router 202.

In one embodiment, optical router 202 is over-provisioned. For example, optical router 202 can be over-provisioned such that the number of output ports of optical router 202 exceeds the number of laser signals output by the laser array. In another example, optical router 202 has more input and/or output ports than there are wavelengths in the system. Over-provisioning optical router 202 can allow for increased flexibility in the reallocation of bandwidth and routing to different end locations dynamically by tuning the laser wavelengths.

According to one embodiment, optical router 202 has an arrayed waveguide grating (AWG). In one such embodiment, optical router 202 includes phase tuning. For example, optical router 202 can separately tune a phase of each of the plurality of received laser signals 204a-204n, wherein the optical router 202 is to output the signals to one or more of the output ports 208a-208n based further on the phase of each of the plurality of received laser signals. Such phase tuning can compensate for fabrication tolerances and/or can be performed in order to change the routing properties of the AWG. For example, wavelength x on input port 206a can be changed from output port 208a to output port 208b by changing the phase in the AWG arm. Optical router 202 can also include common phase tuning (to, for example, compensate for temperature changes). Phase tuning can be performed by heating, carrier injection/depletion, or any other means of phase tuning. In one embodiment where phase tuning sections are added to an AWG optical router, different configurations are possible in which input signals are routed to different ports even if the wavelength of input laser signals is not changed.

In another embodiment, optical router 202 has an Echelle grating. In one such embodiment, the Echelle grating can have common phase tuning for the plurality of received laser signals 204a-204n. In one embodiment, optical router 202 includes heater(s) to control and/or stabilize the router during temperature changes.

Figure 3A:
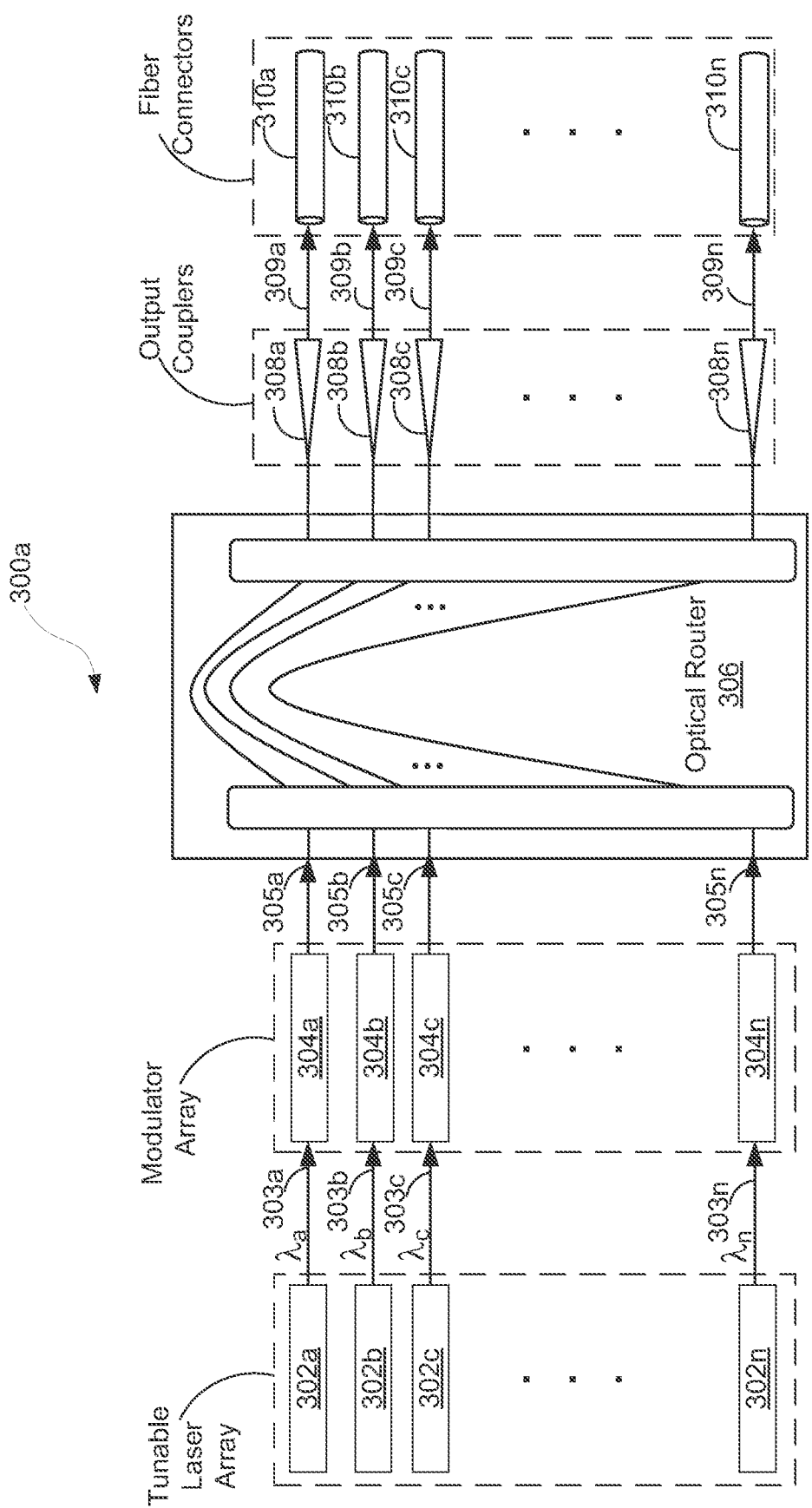
FIG. 3a is a block diagram of a reconfigurable optical transmitter according to an embodiment of the invention.

FIGS. 3a-3e are block diagrams of a reconfigurable optical transmitter according to embodiments of the invention. In FIG. 3a, optical transmitter 300a includes tunable laser array 302a-302n, modulator array 304a-304n, optical router 306, output couplers 308a-308n, and fiber connectors 310a-310n. Other embodiments may include more or fewer components, or components in different configurations. For example, optical router 306 can be on a separate chip than tunable laser array 302a-302n, and coupled via additional fiber connectors.

Tunable laser array outputs a plurality of laser signals 303a-303n. The plurality of laser signals 303a-303n has wavelengths $\lambda_a$-$\lambda_n$, which are tunable based on electrical signals. For example, the wavelengths $\lambda_a$-$\lambda_n$, of the plurality of laser signals 303a-303n can be tuned based on control signals generated due to a user request. In one embodiment, modulator array 304a-304n receives and modulates the plurality of laser signals 303a-303n based on other electrical signals. Modulator array 304a-304n outputs a plurality of modulated laser signals 305a-305n to input ports of optical router 306. Optical router 306 then outputs the plurality of received modulated laser signals to one or more output ports in the generated output configuration based on the wavelength of each of the tuned wavelength of each of the plurality of received modulated laser signals. Other embodiments may not include a modulator array.

Figure 3B:
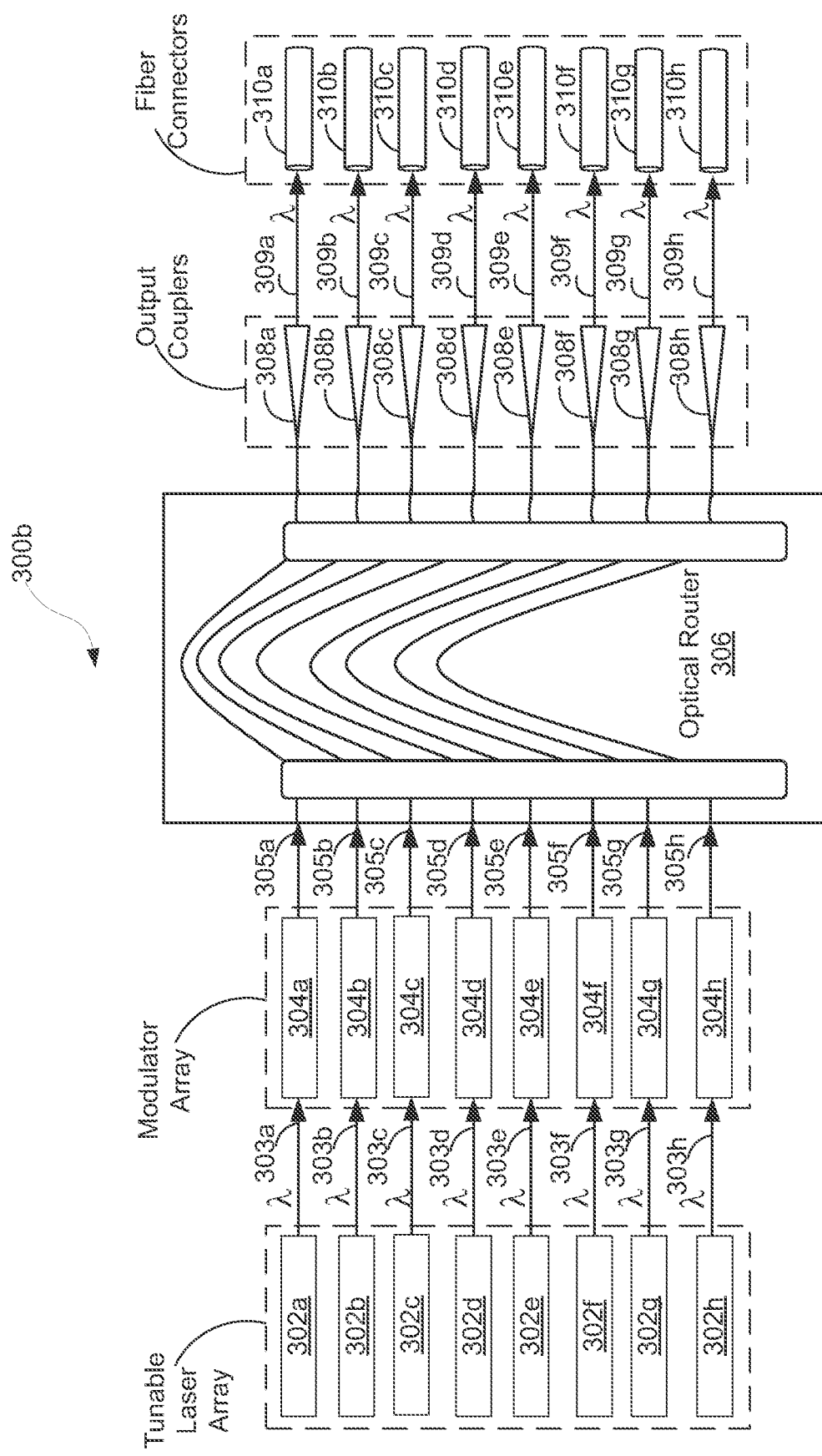
FIG. 3b is a block diagram of a reconfigurable optical transmitter in a parallel configuration according to an embodiment of the invention.
Figure 3C:
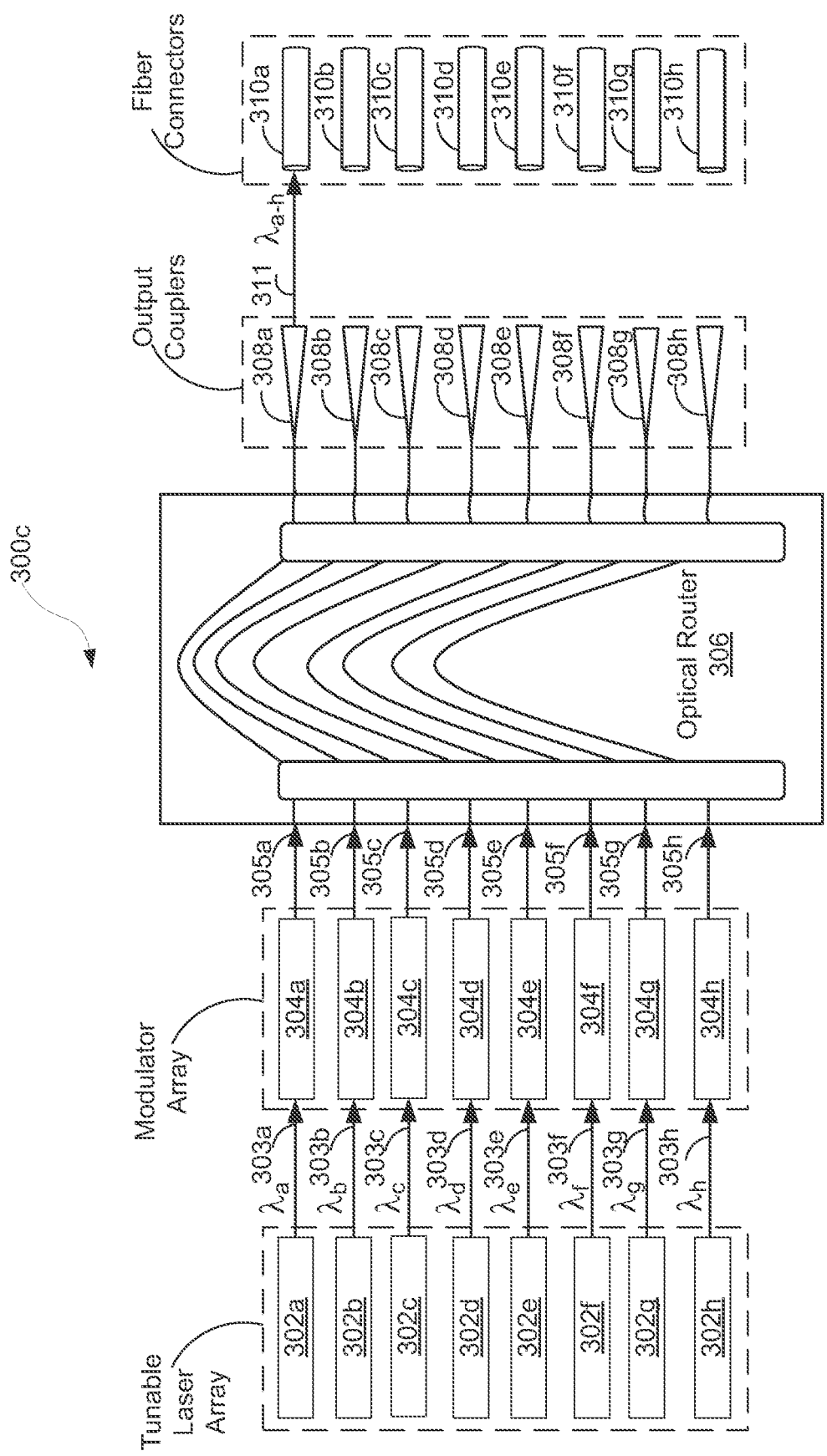
FIG. 3c is a block diagram of a reconfigurable optical transmitter in a single-port wavelength-division multiplexing (WDM) configuration according to an embodiment of the invention.
Figure 3D:
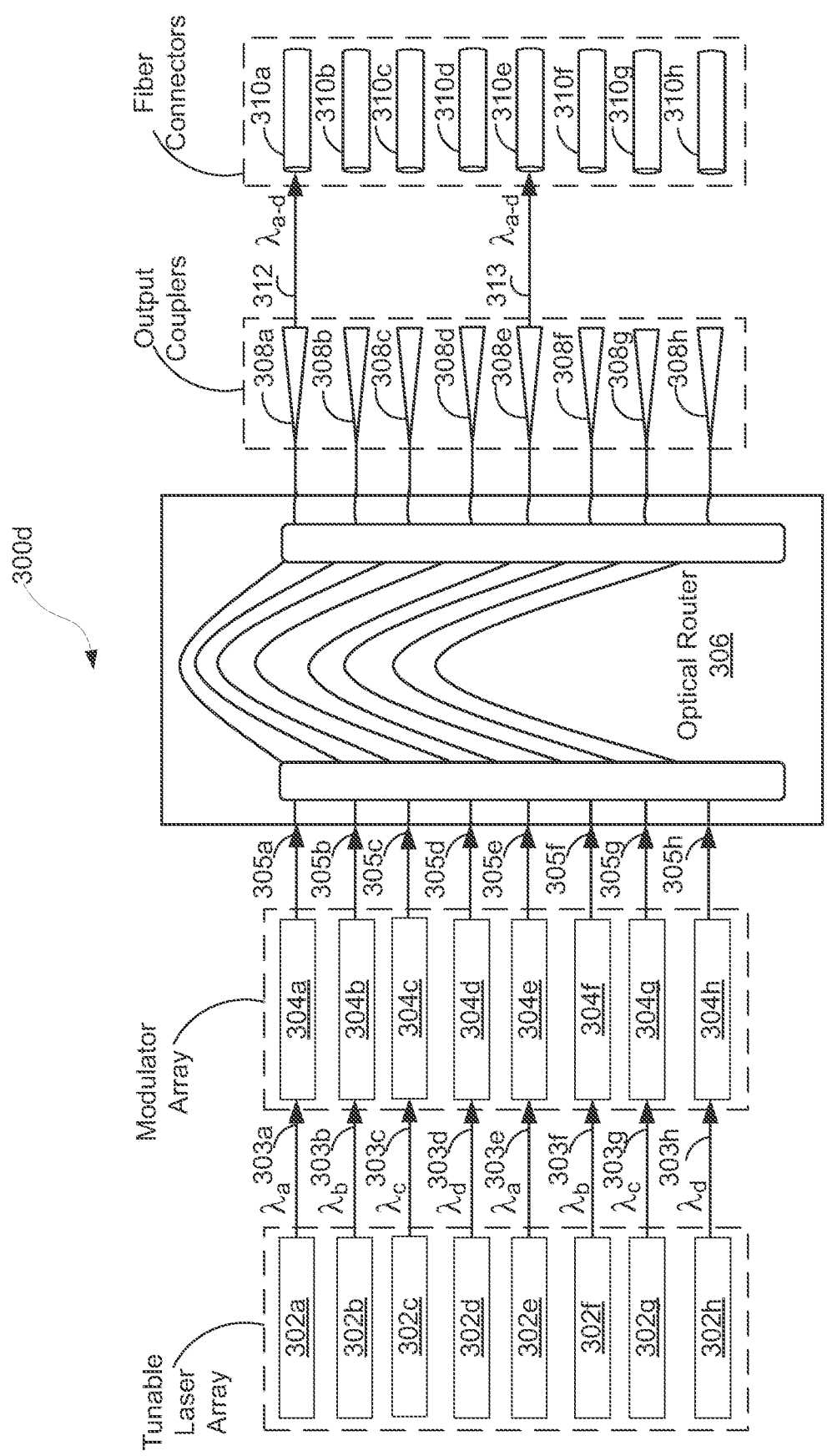
FIG. 3d is a block diagram of a reconfigurable optical transmitter in a multi-port WDM configuration according to an embodiment of the invention.

FIG. 3b-3d illustrate different configurations of a reconfigurable optical router according to embodiments of the invention. The exemplary configurations in FIG. 3b-3d illustrate output ports with different bandwidth densities, which are configurable based on one or more electrical signals for tuning the wavelength of received laser signals. These examples illustrate eight-port optical transmitters 300b-300d, each having tunable laser array 302a-302h for outputting up to eight laser signals 303a-303h, modulator array 304a-304h for modulating up to eight laser signals to output modulated laser signals 305a-305h, optical router 306 with eight ports capable of outputting eight laser signals via output couplers 308a-308h, and eight corresponding fiber connectors 310a-310h. However, other embodiments include optical transmitters with any number of ports, as well as optical transmitters with an asymmetric number of generated laser signals and optical router output ports (e.g., a transmitter in which a tunable laser array is capable of outputting more signals than the optical router is capable of outputting or a transmitter with an optical router having more output ports than the number of tunable lasers).

FIG. 3b illustrates reconfigurable optical transmitter 300b with a parallel port configuration according to an embodiment of the invention. In this example, if all input wavelengths are substantially the same, the output of optical router 306 is a parallel array of the same wavelength. In this embodiment, the wavelengths of the plurality of received modulated laser signals 305a-305h is the same (e.g., $\lambda$), but the signals 305a-305h can be turned as a group to another wavelength (e.g., $\lambda_2$). Responsive to detecting that each of the plurality of received modulated laser signals 305a-305h has a substantially same wavelength (e.g., $\lambda$), optical router 306 outputs each of the plurality of received modulated laser signals to a different output port. In this example, laser signals 309a-309h output by optical router 306 have the same wavelength, $\lambda$.

FIG. 3c illustrates reconfigurable optical transmitter 300c with a single-port wavelength division multiplexing (WDM) configuration. In this example, if all incoming wavelengths are different, optical router 306 combines and outputs all the incoming signals to the same port (i.e., configuring the bandwidth density of a port to output a plurality of signals). Responsive to detecting that each of the plurality of received modulated laser signals 305a-305h has a different wavelength (e.g., $\lambda_a$-$\lambda_h$), optical router 306 outputs each of the plurality of received modulated laser signals to a same output port (e.g., via output coupler 308a). In this example, laser signal 311 has all the different input wavelengths $\lambda_a$-$\lambda_h$. In one embodiment, the output port is selected based on which specific laser is set to which specific wavelength.

FIG. 3d illustrates reconfigurable optical transmitter 300d with a multi-port WDM configuration according to one embodiment. In this example, the wavelengths of the plurality of received modulated laser signals 305a-305h can be tuned in groups (e.g., two groups of signals having wavelengths $\lambda_a$-$\lambda_d$) to achieve the configuration of optical transmitter 300d. Responsive to detecting that two or more of the plurality of received modulated laser signals 305a-305h have a same first wavelength (e.g., $\lambda_a$) and two or more of the plurality of received modulated laser signals 305a-305h have a same second wavelength (e.g., $\lambda_b$), the optical router 306 outputs the plurality of received modulated laser signals in sets 312 and 313, wherein each of the sets 312 and 313 combines two or more of the received modulated laser signals having different wavelengths, and wherein each of the sets is output to a different output port (e.g., via output couplers 308a and 308e). In one such example, each wavelength in each set is different from the others in the set, but potentially the same as in a different set.

Other embodiments can include any combination of routing laser signals at the input ports to one or more of the output ports. The output ports of the optical router outputting the combined signals can also be dynamically changed by tuning the wavelengths of the laser signals 303a-303h. In this embodiment, by tuning the correct lasers to the correct wavelengths it is possible to have multiple fibers that have a specific set of wavelengths on them (and each set contains different data).

Figure 3E:
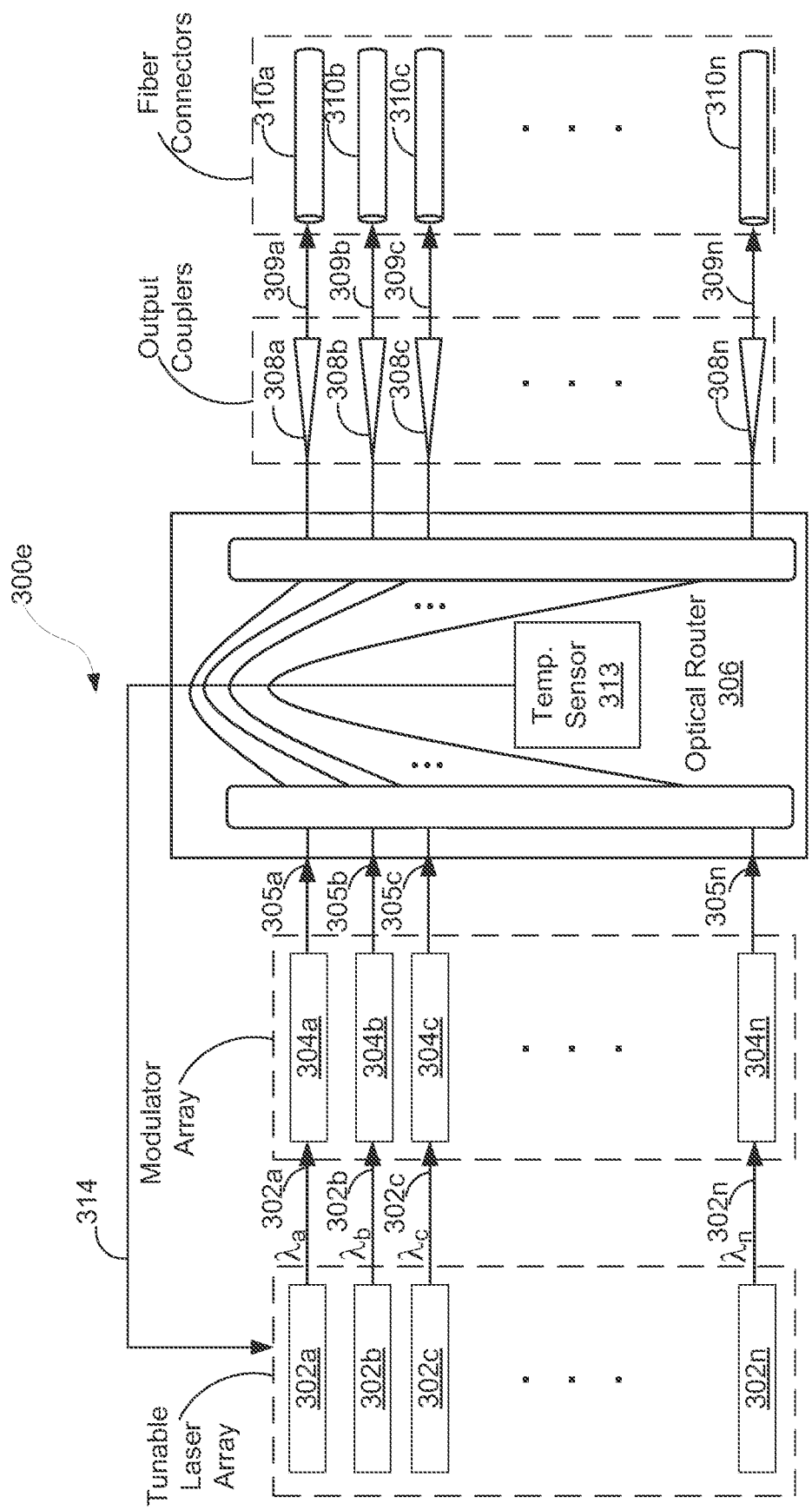
FIG. 3e is a block diagram of a reconfigurable optical transmitter with compensation for temperature fluctuations according to an embodiment of the invention.

FIG. 3e is a block diagram of reconfigurable optical transmitter 300e with compensation for temperature fluctuations according to an embodiment of the invention. As the temperature changes in optical router 306, the routing configuration can change due to changes in the refractive index. In order to compensate for this effect, existing optical routers must be made temperature insensitive or must be temperature stabilized to keep the output configuration from changing due to temperature fluctuations.

In this embodiment, the wavelengths of the plurality of laser signals 302a-302n can be changed to compensate for the shift in the router's wavelength response. Optical router 306 includes temperature sensor 313. Temperature sensor 313 detects a temperature of the optical router and sends data related to the detected temperature of the optical router to the tunable laser array 302a-302n. The tunable laser array can then tune the wavelengths of the plurality of laser signals 302a-302n based on the data related to the temperature of the optical router.

In one embodiment, additional fine tuning of the router is performed to align the router to the wavelength grid, but the bulk of the tuning can achieved by the input laser wavelength tuning. In one such embodiment, compensating for temperature changes by tuning the plurality of laser signals 302a-302n reduces power usage because the most temperature tuning that must occur in optical router 306 is that associated with one increment in wavelength (as opposed to several).

Figure 4A:
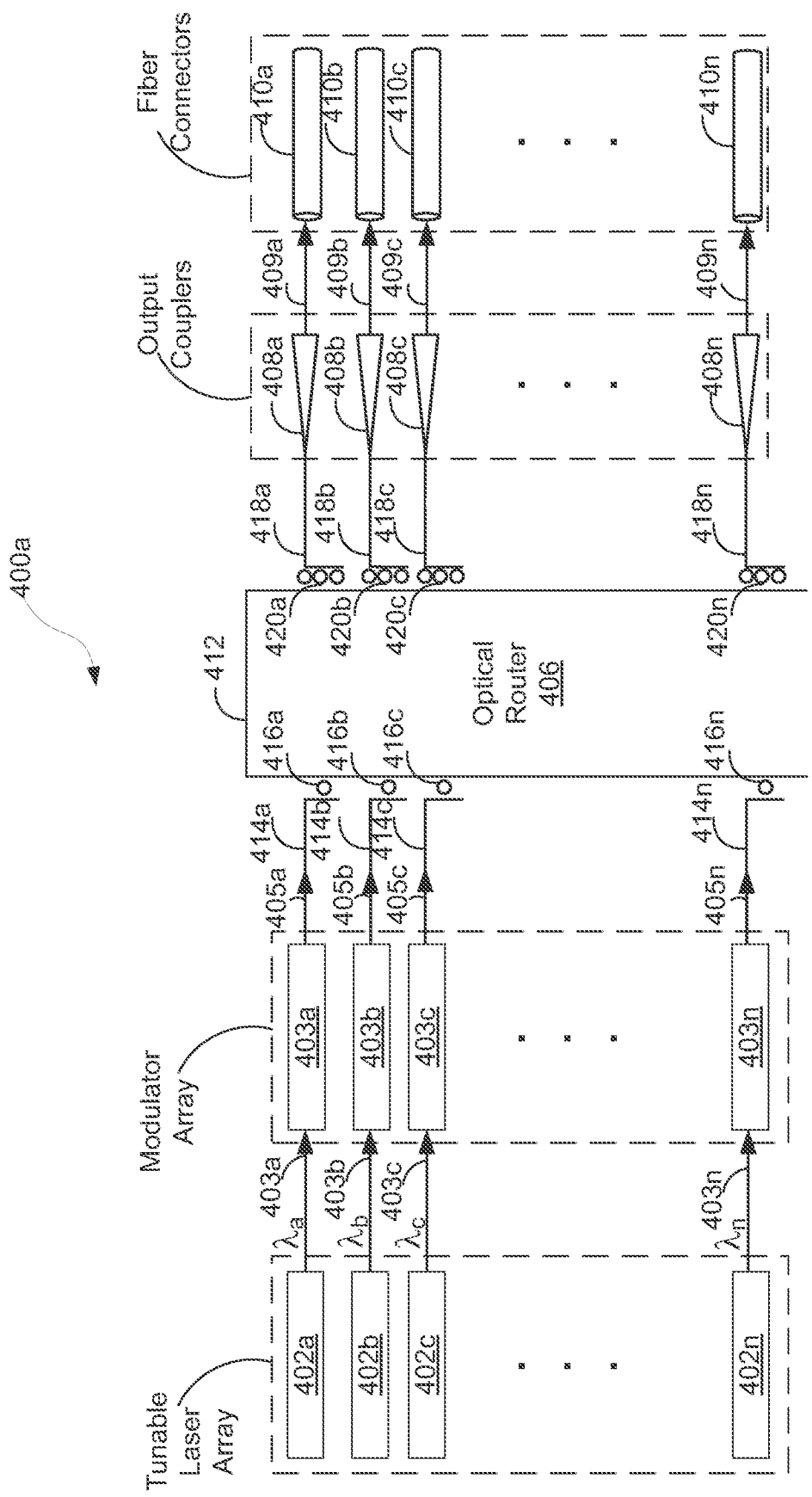
FIG. 4a is a block diagram of a reconfigurable optical transmitter with a ring-based router according to an embodiment of the invention.
Figure 4B:
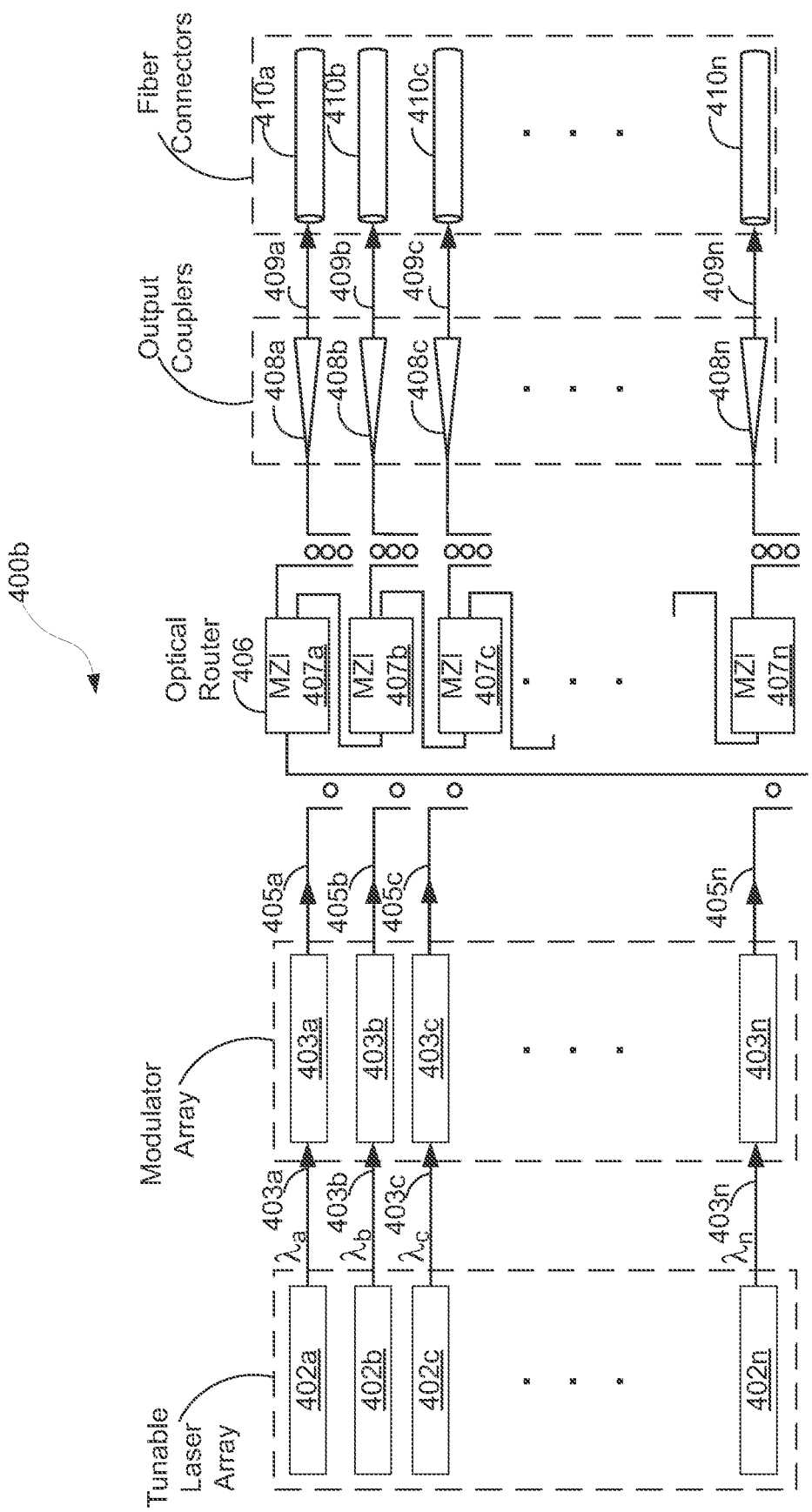
FIG. 4b is a block diagram of a reconfigurable optical transmitter with a ring and Mach Zehnder interferometer (MZI) based router according to an embodiment of the invention.

FIG. 4a-4b are block diagrams of reconfigurable optical transmitters with ring based routers according to embodiments of the invention. Optical transmitters 400a and 400b include tunable laser array 402a-402n and ring-based optical router 406. In one embodiment, optical transmitters 400a and 400b further include modulator array 403a-403n, output couplers 408a-408n, and fiber connectors 410a-410n. Input ports of optical router 406 include input waveguides 414a-414n coupled with a bus waveguide 412 via input ring resonators 416a-416n. In one embodiment, each of the input waveguides 414a-414n is coupled with bus waveguide 412 via one ring resonator. In one embodiment, the rings can have heaters and/or carrier modulation to stabilize performance as temperature changes. In other embodiments, other means of transmitting laser light to optical router 406 can be used.

As illustrated, the individual incoming laser signals 405a-405n are all added to the same bus waveguide 412 by individual ring resonators. In one such embodiment, laser signals 405a-405n all have different wavelengths in order to preserve data carried by each of the laser signals 405a-405n when transmitted to the same bus waveguide 412.

In one embodiment, each of the output ports comprises an output waveguide (one of 418a-418n) coupled with bus waveguide 412 via a plurality of output ring resonators (one of the pluralities of output ring resonators 420a-420n). According to one embodiment, each of the plurality of output ring resonators of each output port corresponds to a different wavelength of laser signal.

According to one embodiment, the pluralities of output ring resonators 420a-420n are tunable to output one or more of the plurality of received modulated laser signals 405a-405n to the one or more output ports in the generated output configuration based on the wavelength of each of the plurality of received modulated laser signals 405a-405n. The pluralities of output ring resonators are also tunable to change the wavelengths of the laser signals output at the output ports. In one embodiment, a coupling of the pluralities of output ring resonators and the bus waveguide is also tunable to output a part of one of the plurality of received modulated laser signals to allow the signal to be output to multiple output ports. Tuning the coupling of the output ring resonators can enable signals to be split and sent to multiple destinations. In one embodiment, optical router 406 can route any combination of input laser signals to connect to any combination of output ports.

FIG. 4b is a block diagram of a reconfigurable optical transmitter with a ring and Mach Zehnder interferometer (MZI) based router according to an embodiment of the invention. In this embodiment, optical router 406 includes a Mach Zehnder interferometer (MZI) added to each of the output waveguides (shown as 407a-407n). In one embodiment, the rings and MZIs can have heaters and/or carrier modulation to stabilize performance as temperature changes.

According to one embodiment, a MZI enables different ratios of signals to be split to different output waveguides without relying on changes to the output ring coupling. The plurality of output ring resonators can be critically coupled and the amount of power dropped to each channel is controlled by the MZI. In one embodiment, all wavelengths will be split in equal ratios in this configuration. For example, in a 16-channel system if optical router 406 outputs all wavelengths to all output ports, the 407a drops $\frac{1}{16}$ of the power, MZI 407b drops $\frac{1}{15}$ of the power, MZI 407c drops $\frac{1}{14}$, etc.

Figure 5:
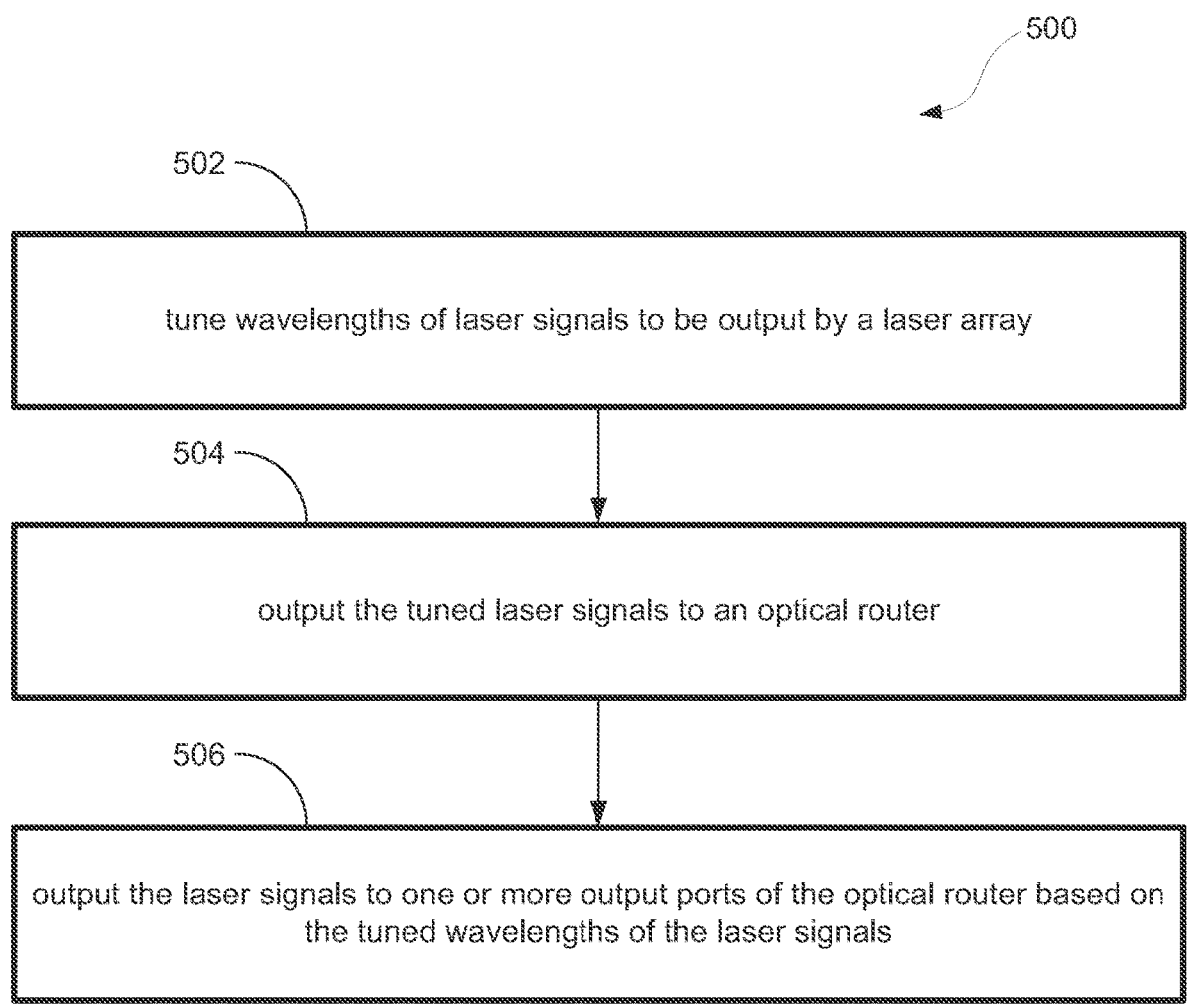
FIG. 5 is a flow diagram of dynamic reconfiguration of an optical transmitter.

FIG. 5 is a flow diagram of dynamic reconfiguration of an optical transmitter. Method 500 can be implemented using a system or apparatus described herein, or any other optical router. Although shown in a particular sequence or order, unless otherwise specified, the order of the actions can be modified. Thus, the illustrated implementations should be understood only as examples, and the illustrated method can be performed in a different order, and some actions may be performed in parallel. Additionally, one or more actions can be omitted in various embodiments of the invention; thus, not all actions are required in every implementation.

Method 500 tunes, based on electrical signals, wavelengths of a plurality of laser signals to be output by a laser array, wherein the wavelengths of the laser signals are to determine which of one or more output ports of an optical router the laser signals are output to, 502. In one embodiment, a modulator modulates the plurality of laser signals based on received electrical signals. The laser array outputs the plurality of laser signals to the optical router and the optical array receives the plurality of modulated laser signals, 504.

The optical router outputs the plurality of received modulated laser signals to one or more output ports of the optical router based on the tuned wavelength of each of the plurality of received modulated laser signals, 506.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed:

1. An optical device comprising:
a plurality of input ports;
a configurable number of output ports, the plurality of input ports to receive a plurality of optical fields generated by one or more light sources, one or more of the output ports to receive one or more of the plurality of optical fields by changing a variable bandwidth of the one or more of the output ports to output additional wavelengths of additional optical fields from the plurality of input ports; and
a controller coupled to the optical device to change the number of output ports and change the variable bandwidth of the one or more of the output ports.

2. The optical device of claim 1, wherein, in response to detecting that the plurality of optical fields have a substantially same wavelength, the number of output ports of the optical device is configured such that each of the optical fields is output to a different output port from the output ports.

3. The optical device of claim 1, wherein, in response to detecting that the plurality of optical fields has a substantially different wavelength, the number of output ports of the optical device is configured to output each of the optical fields to a single output port of the output ports.

4. The optical device of claim 1, wherein the variable bandwidth of the one or more of the output ports is configurable to output at least two of the optical fields having different wavelengths.

5. The optical device of claim 4, wherein each input port comprises an input ring resonator, wherein the one or more of the output ports comprise a plurality of output ring resonators, and wherein the variable bandwidth of the one or more of the output ports is adjustable by changing ring coupling of the plurality of output ring resonators to receive different bandwidths of light.

6. The optical device of claim 1, wherein, in response to detecting that two or more of the plurality of optical fields have a substantially same first wavelength and two or more of the optical fields have a substantially same second wavelength, the output ports of the optical device are configured to output the optical fields in sets, wherein each of the sets combines two or more of the optical fields having different wavelengths, and wherein each of the sets is output to a different output port.

7. The optical device of claim 1, wherein each of the plurality of optical fields is modulated by an optical modulator based on a set of one or more electrical signals.

8. The optical device of claim 1, wherein individual optical fields of the plurality of optical fields are input to a different input port of the plurality of input ports.

9. The optical device of claim 1, wherein the one or more lights sources is a laser array, and where the optical device further comprises:
a temperature sensor to detect a temperature of the optical device and send data related to the temperature of the optical device to the laser array, the laser array to tune wavelengths of the plurality of optical fields based on the data related to the temperature of the optical device.

10. The optical device of claim 1, wherein the optical device comprises a plurality of Mach Zehnder interferometers.

11. The optical device of claim 10, the optical device to further:
separately tune a phase of each of the plurality of optical fields; and
output, using the plurality of Mach Zehnder interferometers, the plurality of optical fields to one or more of the output ports based further on the phase of each of the optical fields.

12. The optical device of claim 10, the optical device to further tune a phase of the plurality of optical fields to compensate for temperature changes of the optical device.

13. The optical device of claim 1, wherein the optical device further comprises the one or more light sources.

14. The optical device of claim 1, wherein the optical device is an optical router.

15. The optical device of claim 1, wherein the changed number of output ports is based on tuned wavelengths of the plurality of optical fields received by the plurality of input ports.

16. The optical device of claim 1, wherein the plurality of input ports and the output ports of the optical device comprise waveguides formed from overlapping regions of a silicon semiconductor material and a III-V semiconductor material.

17. The optical device of claim 1, wherein a quantity of output ports of the optical device exceeds a number of optical fields output by a laser array in the optical device that generates the plurality of optical fields.

18. A method of routing optical fields in an optical device, the method comprising:
receiving a plurality of optical fields using a plurality of input ports of the optical device, the optical device further comprising a configurable number of output ports to output light received at the plurality of input ports, one or more of the output ports having a variable bandwidth that varies to output additional wavelengths of additional optical fields from the plurality of input ports; and
changing, from the configurable number of output ports, a number of output ports that output light and changing the variable bandwidth of the one or more of the output ports.

19. The method of claim 18, further comprising:
detecting that the plurality of optical fields have a substantially same wavelength; and
configuring the number of output ports of the optical device such that each of the optical fields is output to a different output port.

20. The method of claim 18, further comprising:
detecting that the plurality of optical fields have a substantially different wavelength; and
configuring the number of output ports of the optical device such that each of the optical fields is output to a single output port of the output ports, the variable bandwidth of the single output port being adjusted to output wavelengths of the optical fields.

* * * * *